United States Patent
Lin et al.

(10) Patent No.: US 8,985,872 B1
(45) Date of Patent: Mar. 24, 2015

(54) DETACHABLE OPTICAL-ELECTRICAL CONVERTING MODULE AND OPTICAL FIBER CONNECTOR HAVING SAME

(71) Applicant: Hon Hai Precision Industry Co., Ltd., New Taipei (TW)

(72) Inventors: I-Thun Lin, New Taipei (TW); Yi Hung, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 14/097,547

(22) Filed: Dec. 5, 2013

(30) Foreign Application Priority Data

Oct. 21, 2013 (TW) .............................. 102137877 U

(51) Int. Cl.
*G02B 6/36* (2006.01)
*G02B 6/42* (2006.01)

(52) U.S. Cl.
CPC ............ *G02B 6/4214* (2013.01); *G02B 6/4292* (2013.01); *G02B 6/428* (2013.01)
USPC .................................. 385/89; 385/92; 385/93

(58) Field of Classification Search
CPC .... G02B 6/4214; G02B 6/4292; G02B 6/428; G02B 6/3897
USPC ........................................................ 385/88–92
See application file for complete search history.

(56) References Cited

U.S. PATENT DOCUMENTS

| | | | | |
|---|---|---|---|---|
| 6,821,027 | B2 * | 11/2004 | Lee et al. ...................... | 385/89 |
| 8,121,443 | B2 * | 2/2012 | Okada et al. ................... | 385/14 |
| 8,469,610 | B2 * | 6/2013 | Shao et al. ..................... | 385/93 |
| 2011/0123151 | A1 * | 5/2011 | Zbinden et al. ................. | 385/33 |
| 2013/0287406 | A1 * | 10/2013 | Huang et al. ................... | 398/139 |

* cited by examiner

*Primary Examiner* — Ellen Kim
(74) *Attorney, Agent, or Firm* — Novak Druce Connolly Bove + Quigg LLP

(57) ABSTRACT

An optical-electrical converting module includes a housing and a PCB with electrical terminals, optical-electrical converting components, and a reflector. The housing includes a first end surface and an opposite second end surface, and defines a receiving space including a first opening defined in the first end surface and a second opening defined in the second end surface. The PCB is received in the receiving space, the PCB includes a first end adjacent to the first opening and a second end adjacent to the second opening. The electrical terminals are arranged on the second end and are electrically connected with the optical-electrical converting components. The reflector is mounted on the first end, and includes a first optical surface facing the first opening, a second optical surface facing the optical-electrical converting components, and a reflective surface titled relative to the first optical surface and the second optical surface.

9 Claims, 6 Drawing Sheets

US 8,985,872 B1

DETACHABLE OPTICAL-ELECTRICAL CONVERTING MODULE AND OPTICAL FIBER CONNECTOR HAVING SAME

BACKGROUND

1. Technical Field

The present disclosure relates to an optical-electrical converting module and an optical fiber connector including the optical-electrical converting module.

2. Description of Related Art

Optical fiber connectors include active optical fiber connectors and passive optical fiber connectors. The active optical fiber connector has optical-electrical converting components but the passive optical fiber connector does not. The active optical fiber connector can only be coupled with an electronic device having an electric socket, the passive optical fiber connector can only be coupled with an electronic device having an optical socket. Thus, usage of either kind of optical fiber connector is limited.

Therefore, it is desirable to provide an optical fiber connector and an optical-electrical converting module to overcome the shortcomings mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
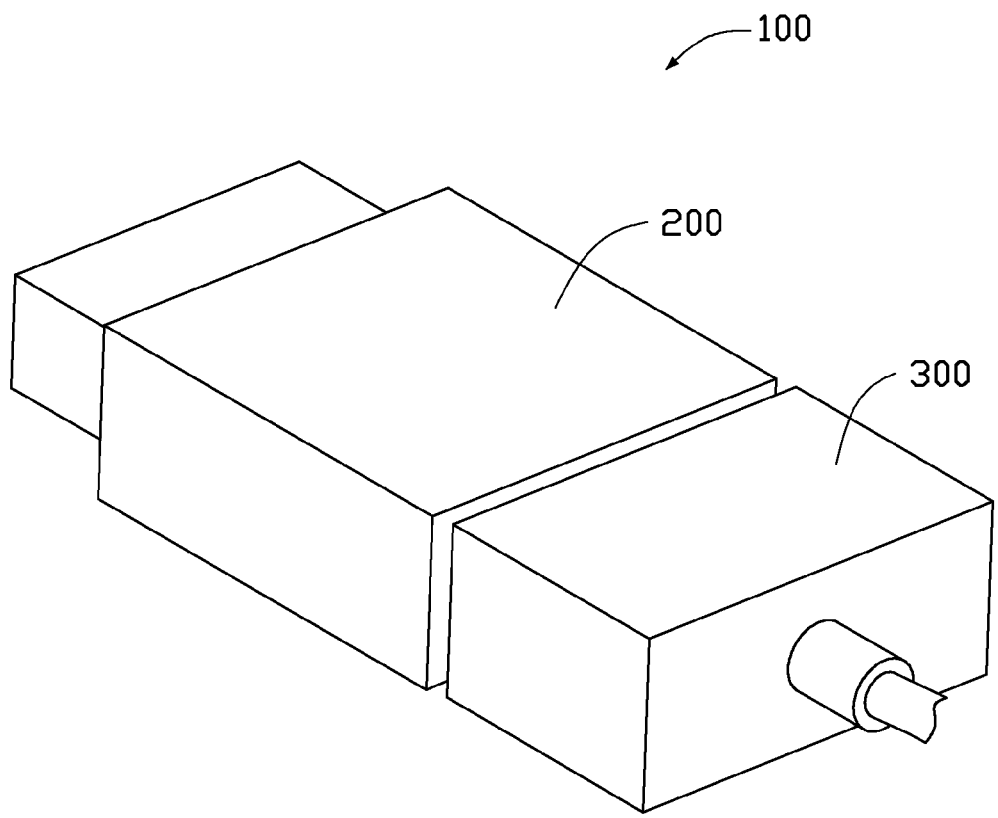
FIG. 1 is a schematic, isometric view of an embodiment of an optical fiber connector including an optical-electrical converting module and a connecting module.
Figure 2:
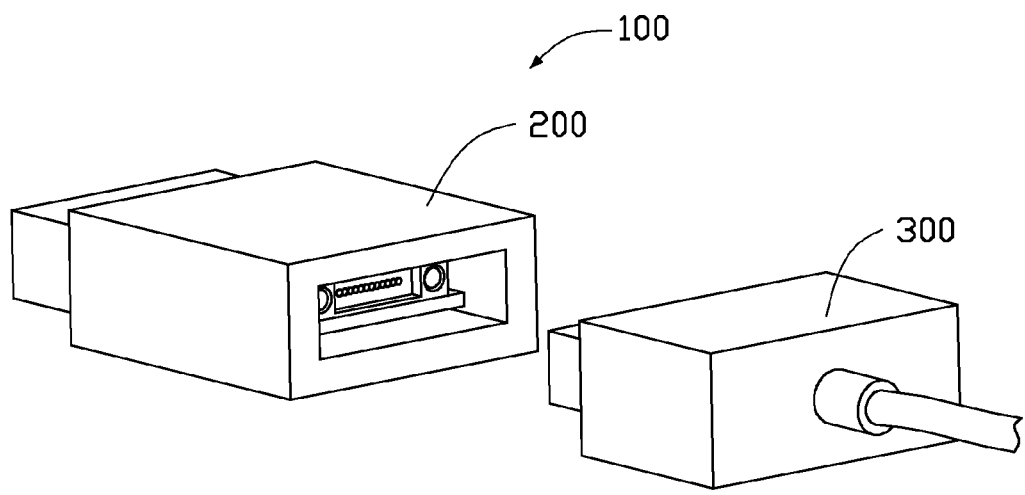
FIG. 2 is a schematic, isometric view showing the connecting module being separated from the optical-electrical converting module.

FIGS. 1 and 2 show an embodiment of an optical fiber connector 100. The optical fiber connector 100 includes an optical-electrical converting module 200 and a connecting module 300. The connecting module 300 is detachably inserted into the optical-electrical converting module 200.

Figure 3:
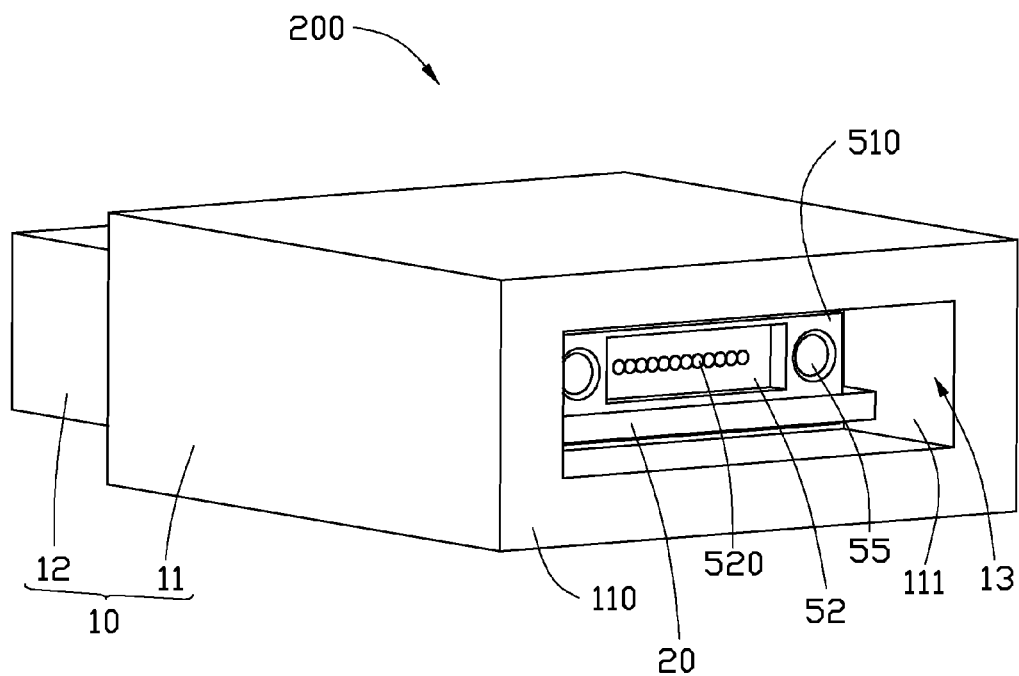
FIG. 3 a schematic view of the optical-electrical converting module of FIG. 1.
Figure 4:
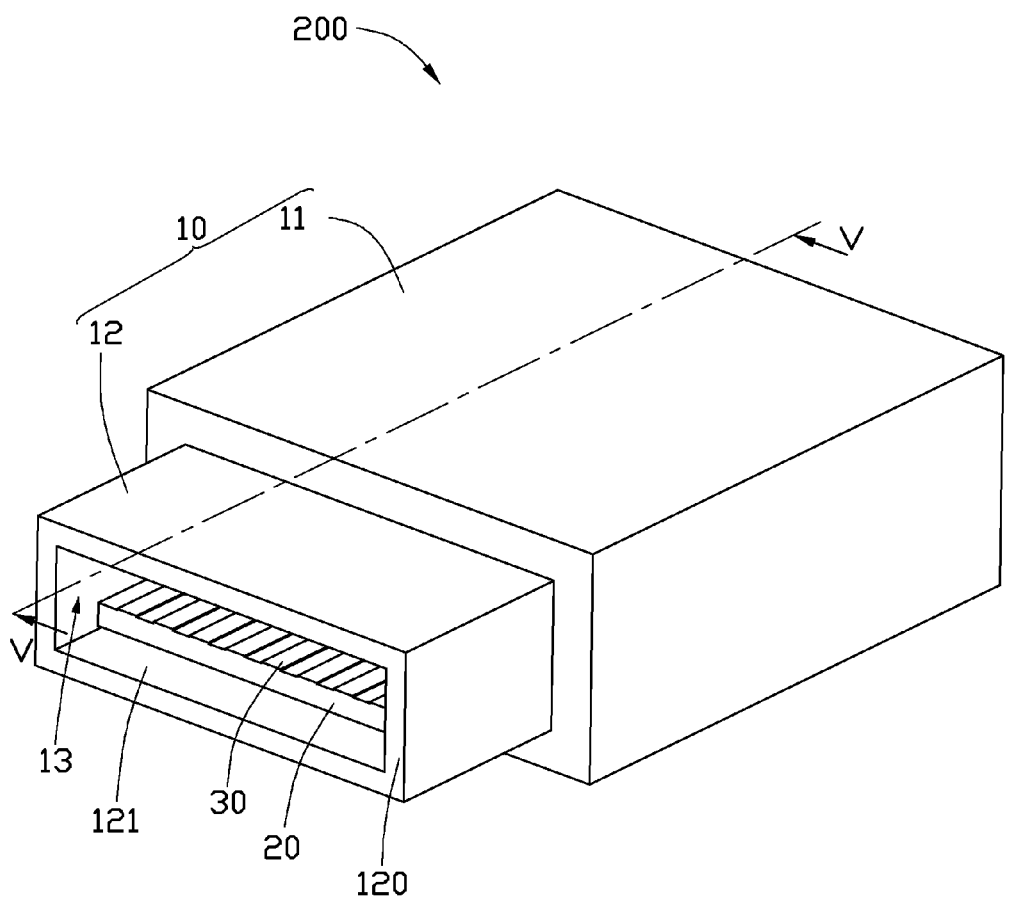
FIG. 4 is similar to FIG. 3, but viewed from another respect.
Figure 5:
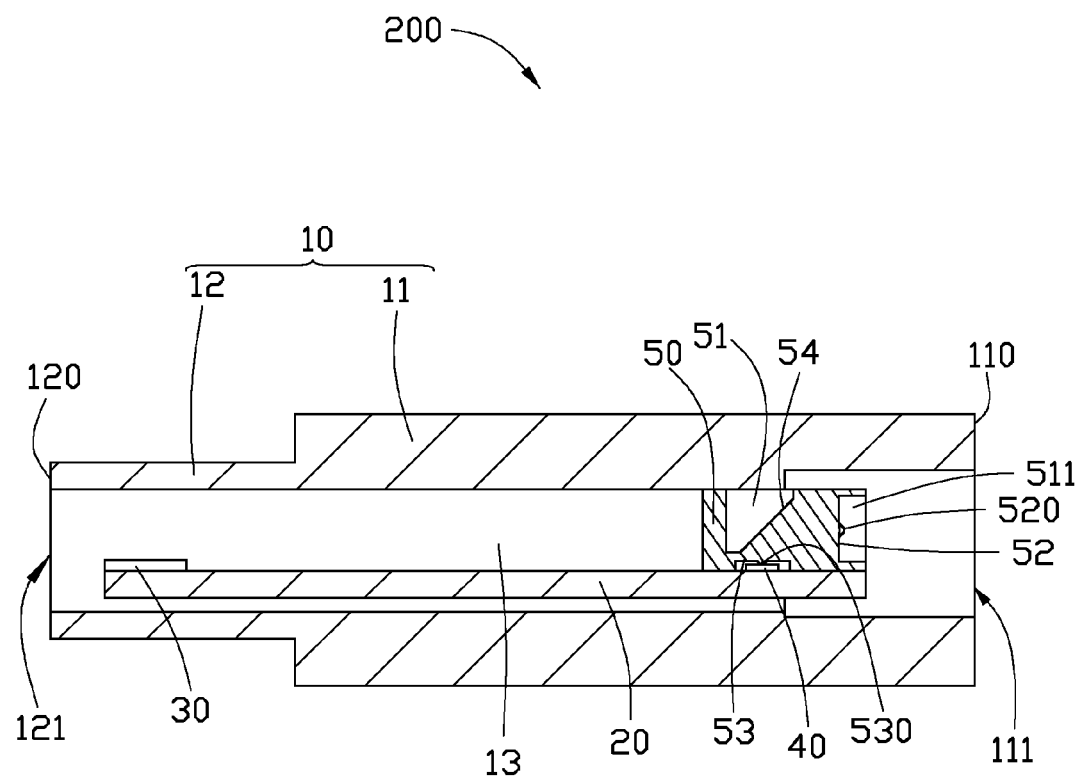
FIG. 5 is a cross-sectional view taken along line V-V of FIG. 4.

FIGS. 3 to 5 show that the optical-electrical converting module 200 includes a housing 10, a printed circuit board (PCB) 20 mounted in the housing 10, a number of electrical terminals 30 mounted on the PCB 20, a number of optical-electrical converting components 40, and a reflector 50.

The housing 10 includes a first part 11 and a second part 12 connected to the first part 11. The first part 11 and the second part 12 are both cubic, and the first part 11 is bigger than the second part 12. The first part 11 includes a first end surface 110 away from the second part 12. The second part 12 includes a second end surface 120 away from the first part 11. The housing 10 defines a receiving space 13 extending through the first end surface 110 and the second end surface 120. The receiving space 13 includes a first opening 111 at the first end surface 110, and a second opening 121 at the second end surface 120. The first opening 111 and the second opening 121 are both rectangular.

The PCB 20 is received in the receiving space 13. Two ends of the PCB 20 are respectively adjacent to the first opening 111 and the second opening 121.

The optical-electrical components 40 are mounted on the PCB 20. The optical-electrical components 40 include photodiodes configured for converting an optical signal into an electrical signal and laser diodes configured for converting an electrical signal into an optical signal.

The electrical terminals 30 are arranged on an end of the PCB 20 adjacent to the second opening 121 and are electrically connected to the optical-electrical converting terminals 40. In this embodiment, the electrical terminals 30 are gold fingers and are exposed from the second opening 121.

The reflector 50 is mounted on an end of the PCB 20 adjacent to the first opening 111 and above the optical-electrical converting components 40. A surface of the reflector 50 away from the optical-electrical converting components 40 defines a groove 51. A surface 510 of the reflector 50 facing the first opening 111 defines a groove 511. The reflector 50 includes a first optical surface 52 in the groove 511 and facing the first opening 111, a second optical surface 53 facing the optical-electrical converting components 40, and a reflective surface 54 in the groove 51. The first optical surface 52 is perpendicular to the second optical surface 53. The reflective surface 54 is tilted relative to the first optical surface 52 and the second optical surface 53. In this embodiment, an included angle between the first optical surface 52 and the reflective surface 54 is about 45 degrees, and an included angle between the second optical surface 53 and the reflective surface 54 is about 45 degrees. A number of first converging lenses 520 are formed on the first optical surface 52. A number of second converging lenses 530 are formed on the second optical surface 53. The first and second converging lenses 520, 530 are convex lenses. The first converging lenses 520 are exposed from the first opening 111. The first converging lenses 520 correspond to the second converging lenses 530 one by one. The second converging lenses 530 are aligned with the optical-electrical converting components 40. A reflective material is coated on the reflective surface 54. When the optical-electrical converting components 40 include laser diodes, first optical signals emitted by the optical-electrical converting components 40 enter the reflector 50 from the second converging lenses 530, are reflected by the reflective surface 54, and are emitted out of the reflector 50 from the first converging lenses 520. When the optical-electrical converting components 40 include photodiodes, second optical signals enter the reflector 50 from the first converging lenses 520, are reflected by the reflective surface 54, are emitted out of the reflector 50 from the second converging lenses 530, and are received by the optical-electrical converting components 40.

The reflector 50 further includes an inserting structure 55 adjacent to the first optical surface 52. In this embodiment, the inserting structure 55 includes inserting holes defined in the surface 510.

Figure 6:
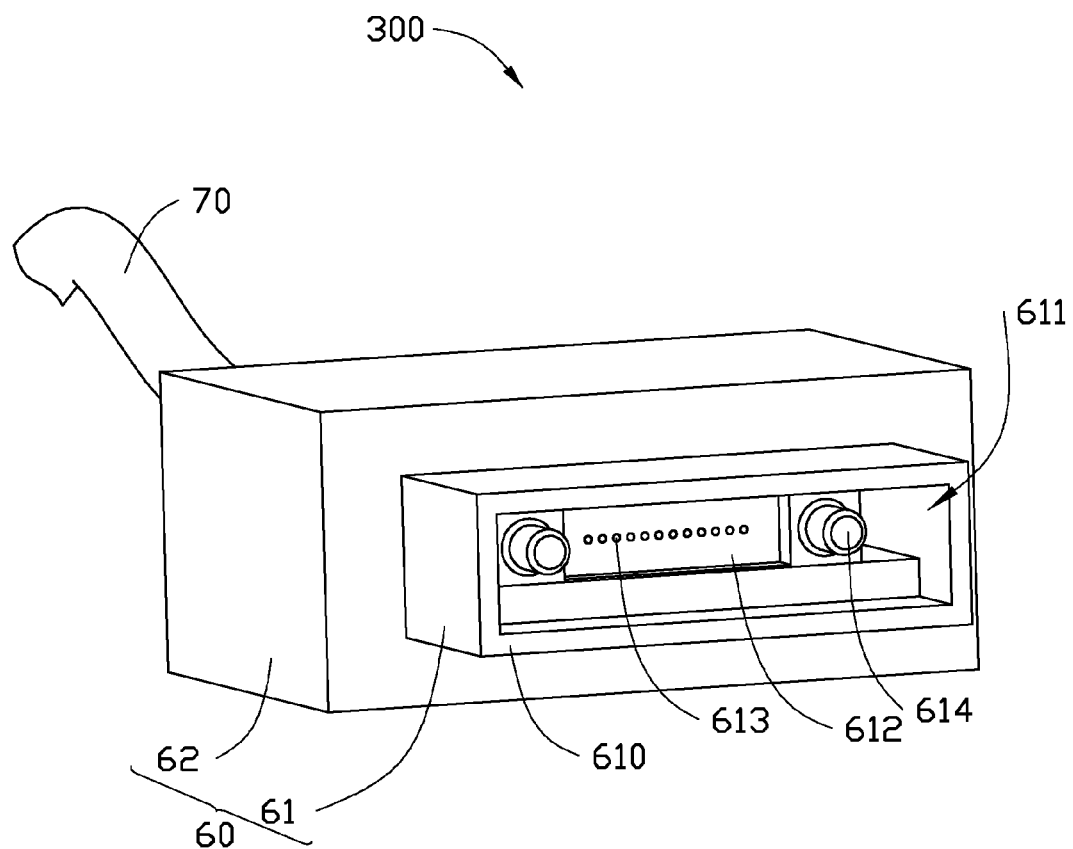
FIG. 6 is a schematic view of the connecting module of FIG. 1.

FIG. 6 shows the connecting module 300 includes a main body 60. The main body 60 includes a third part 61 and a fourth part 62 connected to the third part 61. The third part 61 and the fourth part 62 both are cubic. The third part 61 is smaller than the fourth part 62. A size of the third part 61 corresponds to a size of one end of the receiving space 13 at the first opening 111 and the third part 61 can be inserted into the receiving space 13 from the first opening 111.

The third part 61 includes a third end surface 610 away from the fourth part 62. The third end surface 610 defines a groove 611. The third part 61 includes a third optical surface 612 in the groove 611. A number of third converging lenses 613 are formed on the third optical surface 612. The third converging lenses 613 are convex lenses. The third converging lenses 613 correspond to the first converging lenses 520 one by one. The third part 61 further includes an inserting structure 614 adjacent to the third optical surface 612. In this embodiment, the inserting structure 614 includes inserting rods.

The connecting module 300 further includes optical fibers 70 fixed in the main body 60 and aligned with the third converging lenses 613.

When connecting the optical fiber connector 100 to an electronic device having an electrical socket, the inserting structure 614 engages with the inserting structure 55 to connect the connecting module 300 to the optical-electrical converting module 200. The first converging lenses 520 are aligned with the third converging lenses 613. One end of the optical-electrical converting module 200 including the electrical terminals 30 are inserted into the electrical socket and the electrical terminals 30 are electrically connected to the electrical socket. Electrical signals from the electronic device transmit to the optical-electrical converting components 40 through the electrical terminals 30. The optical-electrical converting components 40 convert the electrical signals into optical signals. The optical signals transmit through the second converging lenses 530, the reflective surface 54, the first converging lenses 520, the third converging lenses 613, and enter the optical fibers 70. Optical signals from the optical fibers 70 transmit through the third converging lenses 613, the first converging lenses 520, the reflective surface 54, the second converging lenses 530 and reach the optical-electrical converting components 40. The optical-electrical converting components 40 convert the optical signals into electrical signals. The electrical signals transmit to the electronic device through the electrical terminals 30.

When connecting the optical fiber connector 100 to an electronic device having an optical socket, the connecting module 300 is separated from the optical-electrical converting module 200. The connecting module 300 is inserted into the optical socket and is optically coupled with the optical socket, and optical signals can be exchanged between the optical fibers 70 and the electronic device.

The optical fiber connector 100 includes detachable optical-electrical converting module 200 and connecting module 300. The optical-electrical converting module 200 can be coupled with an electrical socket, the connecting module 300 can be coupled with an optical socket. Thus, the optical fiber connector 100 is compatible with both kinds of electronic device.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. An optical-electrical converting module, comprising:
  a housing comprising a first end surface and a second end surface opposite to the first end surface, and defining a receiving space, the receiving space comprising a first opening defined in the first end surface and a second opening defined in the second end surface;
  a printed circuit board (PCB) received in the receiving space, the PCB comprising a first end and a second end opposite to the first end, the first end being adjacent to the first opening, the second end being adjacent to the second opening;
  a plurality of electrical terminals arranged on the second end;
  a plurality of optical-electrical converting components mounted on the PCB and electrically connected to the electrical terminals; and
  a reflector mounted on the first end, the reflector comprising a first optical surface facing the first opening, a second optical surface facing the optical-electrical converting components, and a reflective surface titled relative to the first optical surface and the second optical surface, the optical-electrical converting components optically communicating with outside through the second optical surface, the reflective surface, and the first optical surface in sequence.

2. The optical-electrical converting module of claim 1, further comprising a plurality of first converging lenses formed on the first optical surface, and a plurality of second converging lenses formed on the second optical surface and corresponding to the first converging lenses one by one.

3. The optical-electrical converting module of claim 1, wherein the electrical terminals are exposed from the second opening, and the first optical surface is exposed from the first opening.

4. The optical-electrical converting module of claim 1, wherein the reflector further comprises an inserting structure adjacent to the first optical surface.

5. An optical fiber connector, comprising:
  an optical-electrical converting module, comprising:
    a housing comprising a first end surface and a second end surface opposite to the first end surface, and defining a receiving space, the receiving space comprising a first opening defined in the first end surface and a second opening defined in the second end surface;
    a printed circuit board (PCB) received in the receiving space, the PCB comprising a first end and a second end opposite to the first end, the first end being adjacent to the first opening, the second end being adjacent to the second opening;
    a plurality of electrical terminals arranged on the second end;
    a plurality of optical-electrical converting components mounted on the PCB and electrically connected to the electrical terminals; and
    a reflector mounted on the first end, the reflector comprising a first optical surface facing the first opening, a second optical surface facing the optical-electrical converting components, and a reflective surface titled relative to the first optical surface and the second optical surface; and
  a connecting module detachably connected to the optical-electrical converting module, the connecting module comprising:
    a main body comprising a third optical surface;
    a plurality of optical fibers mounted in the main body, the optical fibers optically communicating with the optical-electrical converting components through the third optical surface, the first optical surface, the reflective surface and the second optical surface.

6. The optical fiber connector of claim 5, wherein the reflector further comprises a plurality of first converging lenses formed on the first optical surface, and a plurality of second converging lenses formed on the second optical surface and corresponding to the first converging lenses one by one.

7. The optical fiber connector of claim 6, wherein the main body further comprises a plurality of third converging lenses formed on the third optical surface and aligned with the first converging lenses one by one.

8. The optical fiber connector of claim 5, wherein the electrical terminals are exposed from the second opening, and the first optical surface is exposed from the first opening.

9. The optical fiber connector of claim 5, wherein the reflector further comprises a first inserting structure adjacent to the first optical surface, the main body further comprises a second inserting structure adjacent to the third optical surface, the first inserting structure engages with the second inserting structure.

\* \* \* \* \*